United States Patent [19]

Frimmel, Jr. et al.

[11] Patent Number: 4,741,028
[45] Date of Patent: Apr. 26, 1988

[54] METHOD OF RANDOMIZING TELEPHONE NUMBERS

[75] Inventors: James J. Frimmel, Jr., Reston; Alan R. Trefzger, Sterling, both of Va.

[73] Assignee: International Telesystems Corporation, Herndon, Va.

[21] Appl. No.: 890,644

[22] Filed: Jul. 30, 1986

[51] Int. Cl.⁴ ............................................. H04M 1/27
[52] U.S. Cl. ....................................... 379/355; 379/92
[58] Field of Search .................................... 379/67–69, 379/88–89, 92, 355–359, 209, 10, 11; 364/717

[56] References Cited

U.S. PATENT DOCUMENTS

| | | | |
|---|---|---|---|
| 3,703,727 | 11/1972 | Knowlton | 364/717 X |
| 3,792,203 | 2/1974 | Martin | 379/357 X |
| 3,943,289 | 3/1976 | Sheldon et al. | 379/69 |
| 4,121,830 | 10/1978 | Buckley | 364/717 X |
| 4,201,896 | 5/1980 | Bower et al. | 379/67 |
| 4,438,296 | 3/1984 | Smith | 379/69 |

Primary Examiner—James L. Dwyer
Attorney, Agent, or Firm—James Creighton Wray

[57] ABSTRACT

Pseudorandom numbers are generated for telephone dialing in telephone call management systems by selecting a range of numbers to be dialed, successively randomly generating numbers within that range, comparing each randomly generated number as it is generated with numbers previously generated and recorded or called. When a new randomly generated number matches a previously generated number, a further number is generated and the compared. When no match is encountered, the new number is recorded or called. After recording or calling a predetermined amount of numbers within the range, remaining numbers to complete the range of numbers are selected sequentialy from an array of numbers. The final numbers are recorded or called in sequence, but the steps between the final numbers vary randomly according to the random generation of the numbers in the first part.

9 Claims, 1 Drawing Sheet

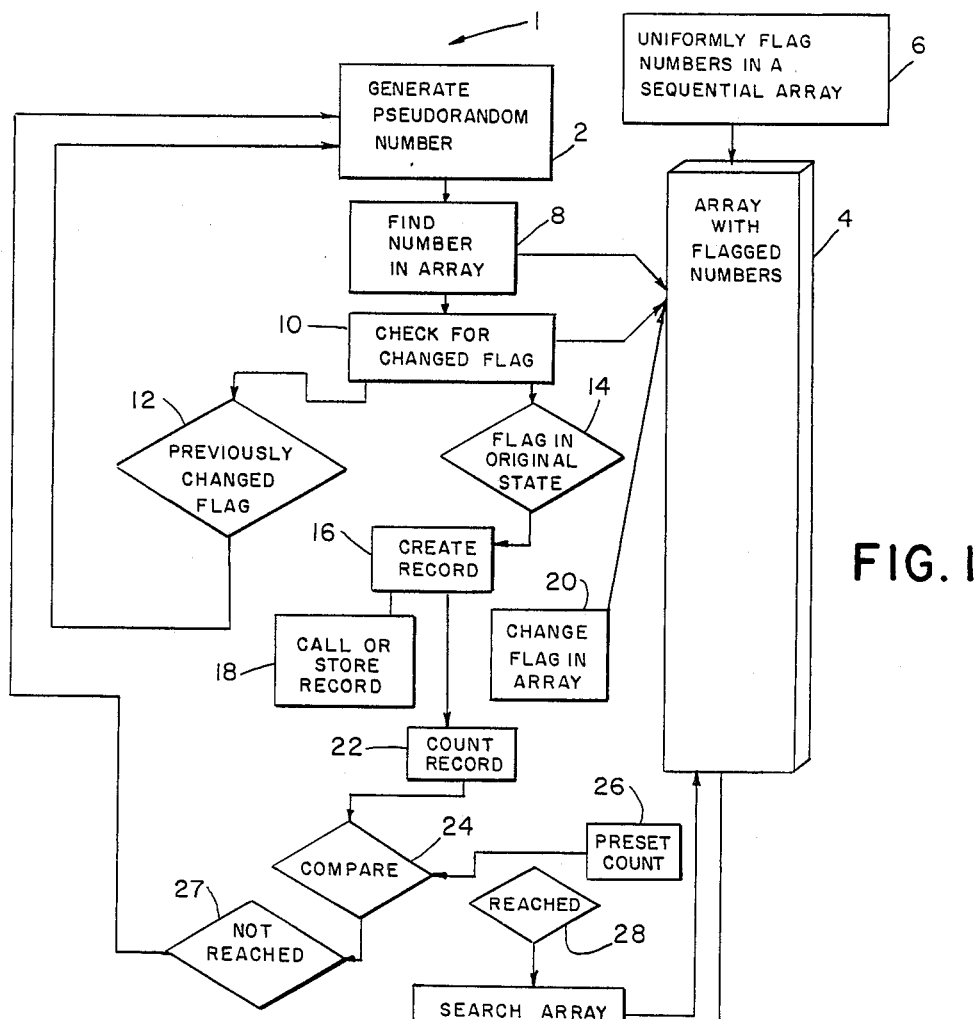
FIG. 1
FIG. 3
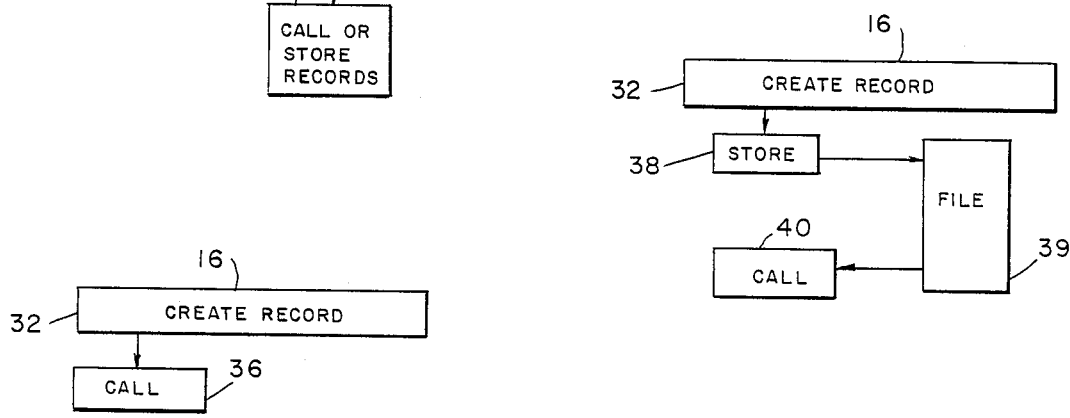
FIG. 2

METHOD OF RANDOMIZING TELEPHONE NUMBERS

BACKGROUND OF THE INVENTION

This invention relates to telephone call management systems and particularly to choosing numbers for dialing.

Telephone call management systems may dial sequential numbers in a particular telephone exchange. That creates a problem in that some of the number sequences may be assigned to the same subscriber. A system that sequentially dials numbers may successively dial a backup number in a single office.

To try to avoid that difficulty, a base number may be chosen and may be incremented by a fixed value, as each number is called in succession. The result is that all numbers may be called in a particular exchange. In large offices with more than 10 lines, for example, repeated calls may be directed to the same office. A problem exists in how to call numbers to ensure that all numbers are called within an exchange but to avoid calling numbers sequentially at a single location.

SUMMARY OF THE INVENTION

The present invention overcomes and avoids the problems of the prior art by generating random or pseudorandom numbers. First the range to be called is chosen. For example, in a three-digit exchange, 10,000 calls may be made to seven-digit telephone numbers within that exchange. The present system randomly selects the last four digits. The computer generates random or pseudorandom numbers and calls them. The system keeps track of what numbers have been called so far. Each new number selected is checked to see if it has been called previously. If that number has been called, another random number is chosen until an as-yet-uncalled number is reached. That avoids calling sequentially, which could result in ringing each phone in an office in succession.

The present system may be used by calling a number as soon as it is generated or by generating records for all numbers and then calling the numbers according to their position on the generated records. It is preferable to generate randomly as many numbers as reasonably possible, flagging numbers in an array as a new number is generated, and then to fill in the remaining numbers in sequence by checking the array for unflagged numbers for adding to records of the randomly generated numbers. For example, generating records for all numbers in an exchange requires generating 10,000 possible numbers. It is preferable to generate the first 90% of the 10,000 numbers with random generation and then to fill in the remaining numbers in sequence with numbers from an array which have been flagged to indicate that those numbers have not been randomly generated.

It is possible to generate a pseudorandom number by dividing a prime number by another prime number, for example 7, and by dividing the result again by that same number, e.g, 7. Each result may be used or the ensuing fraction may be used. Both exist in never-repeating patterns.

Pseudorandom numbers are generated for telephone dialing in telephone call management systems by selecting a range of numbers to be dialed, successively randomly generating numbers within that range, and comparing each randomly generated number as it is generated with flags in an array, which indicate numbers previously generated and recorded or called. When a new randomly generated number matches a previously generated number, a further number is generated and then compared. When no match is encountered, the new number is recorded or called. After recording or calling a predetermined amount of numbers within the range, remaining numbers to complete the range of numbers are selected by finding ungenerated or uncalled numbers in the array and adding numbers from the array to the generated or called numbers when no match is encountered. The final numbers are recorded or called in sequence, but the steps between the final numbers vary randomly according to the random generation of the numbers in the first part.

The preferred system creates the final group of records from numbers in the table in sequential order of the numbers.

The preferred system creates an array of sequential numbers and uniformly flags each number in an original condition, for example, with a binary one. A newly generated number is checked to see if the number in the table has its original flag, one. If so, the flag is changed to the generated number indicator, e.g., zero, and a record is created for that newly generated number. When, upon checking, a zero or other generated number indicator is found, the system simply generates another number and tries again. Finally, after a predetermined amount of new numbers have been successfully pseudorandomly generated, the system looks in the array for all flags still in their original condition. Records are created sequentially for numbers associated with those flags.

The present invention is a method of checking previously generated numbers against current ones.

The invention provides a means of indicating or remembering what numbers have been previously generated.

After recording or calling a predetermined amount of numbers within a selected range according to this invention, the remaining numbers to complete the range of numbers are selected by checking flags in an array indexed by the generated or called numbers and adding a number to the generated or called numbers based on that index into the array where a flag value denoting no previously generation is encountered. The final numbers are recorded or called in sequence, but the steps between the final numbers vary randomly according to the random generation of the numbers in the first part.

The present invention provides a telephone call management random dialing system. An array containing 10,000 flags or a range of flag elements is initialized so that all elements contain the value denoting no previous generation. A pseudorandom number is generated from arrays of possible numbers. The generated random number is used to index into an array of flags. A file record is created for the generated random number and the flag indexed by that number is set to a value indicating that the number has been generated. A further pseudorandom number is generated from a range of possible numbers. That further random generated number is checked for having been previously generated by checking the corresponding array flag. The array is indexed by the further number, and a further file record is created for the further number upon finding that the corresponding array element has the value denoting no previous generated. Other pseudorandom numbers are generated and checked to see whether flags by the other random numbers have been changed in the array. The flags corresponding to those numbers are set to a value denoting generation, and file records are created for those numbers. At a time when less than a predetermined percentage of possible numbers have unchanged flags in the array, the array is checked for the elements still flagged as not previously generated. File records are generated or calls are made for those numbers. If records were generated, records are used to call after the generation of random records is complete.

The preferred method of generating sequential records of numbers to be called in a telephone call management system comprises selecting a three-digit exchange and randomly generating numbers selected from the last four digits of seven-digit telephone numbers in the exchange, generating a four-digit random number, and checking with a flagged array indexed by those random numbers to determine if a flag has been changed for the generated random number. If the flag corresponding to the generated random number is set to the value denoting previous generation, the invention generates another random number. If a flag is set to the value denoting no previous generation for the generated random number, the system changes the flag and creates a record with the generated random number. The system continues to generate random numbers and to check each random number as generated with flags by previously generated random numbers, generating another random number upon finding a flag value denoting previously generation and creating a record with the most recently generated random number and setting the corresponding flag upon finding a number not previously generated. The system counts the records created in sequence with the randomly generated numbers and, upon a predetermined count, creates records with previously non-generated numbers.

The preferred telephone call management number generating system chooses the range to be called, generates pseudorandom numbers, checks an array for previously generated numbers, checks each subsequently pseudorandomly generated number against the array of previously generated numbers using the number as the index into the array, sets the array element indexed by each number by the value denoting previous generation, calls each number not previously in the record, and generates another pseudoransom number upon finding that a generated pseudorandom number matches a previously generated number.

The preferred system then creates records from numbers not previously flagged or generated in the array in sequential order of the numbers.

In one modification of the invention, numbers are generated pseudorandomly in ten groups of one thousand each. The last three digits are randomized.

These and other and further objects and features of the invention are apparent in the disclosure which includes the specification with the above and ongoing description and claims and the drawings.

BRIEF DESCRIPTION OF THE DRAWINGS

FIG. 1 is a schematic flowchart for creating a record of generated numbers and comparing the generated numbers with flagged numbers in an array.

FIG. 2 is a schematic representation of calling numbers upon generations of each new number.

FIG. 3 is a schematic representation of calling numbers after a whole file has been generated.

DESCRIPTION OF THE INVENTION

The present invention provides a telephone call management random dialing system. A pseudorandom number is generated from 10,000 possible numbers. A file record is created for the generated random number. The generated random number is called or is stored in a file. A further pseudorandom number is generated from 10,000 possible numbers. That further random generated number is compared with earlier random numbers generated, called or stored and flagged in an array. A further file record is created for the further number upon finding no matches in the array. The further number is called or is stored in the file. Other pseudorandom numbers are generated and checked to see whether the other random numbers have been generated. At a time when a predetermined percentage or less of possible numbers remains ungenerated, an array is checked for the ungenerated numbers, and a file is filled with the heretofore ungenerated numbers which are called in numerical sequence. When calls are not made immediately upon generating numbers, file records are generated for those numbers and the numbers are dialed after randomizing part of or the entire exchange.

The preferred method of generating numbers to be called in a telephone call management system comprises selecting a three-digit exchange and randomly generating numbers selected from the last four digits of seven-digit telephone numbers in the exchange. Generated four-digit random numbers are checked with an array which indicates previously generated random numbers to determine if a record exists for each newly generated random number. If an indication does exist for that generated random number, the invention generates another random number. If a record does not exist for the generated random number, a record is created with the generated random number. The system continues to generate random numbers in sequence and checks each random number as generated with records of previous random numbers, generating another random number upon a record match and creating a record with the most recently generated random number upon no match. The system counts the records created with the randomly generated numbers and, upon a predetermined count, creates further records in numerical sequence with previously non-generated numbers.

The preferred telephone call management number generating system chooses the range to be called, generates pseudorandom numbers, calls the pseudorandom numbers in the order generated, makes a record of previously generated called numbers, checks each subsequently pseudorandomly generated number with records of previously generated called numbers, calls each number not previously shown in the record, makes a new record for the called number, and generates another pseudorandom number upon finding that a generated pseudorandom number matches a previously generated number.

The preferred system further counts the generated and called numbers, checks a sequential table of numbers for numbers previously generated and calls and creates a record upon finding a number in the table which has not been generated for calling.

DETAILED DESCRIPTION OF THE DRAWINGS

A system for randomly generating telephone numbers is generally referred to by numeral 1 in FIG. 1. In the first step, any number, for example, a four-digit number is generated pseudorandomly 2. That number generated in step 2 is checked with previously generated and flagged numbers. For example, an array 4 of previously uniformly flagged 6 sequential numbers is checked 8 with the new number. If a match is found, for example, if a changed flag is found 12, a new number is generated 2. The new number is checked 10 with previously generated numbers. If no match, e.g., an unchanged flag is found 14, a record 16 is created and called or stored 18. The system continues to generate 2 numbers and to check 10 the numbers with previously stored records 4. Upon finding that a number has been previously generated, a new number is generated 2. If the number has not been generated previously 14, a new record 16 is created and the flag in the array 4 is changed 20. The number of records is counted 22. If comparison 24 shows that the predetermined count 26 has not been reached 27, a new number is generated 2. When the predetermined count 26 is reached 28, the last numbers are generated sequentially by searching 30 through the array 4. When an unchanged flag is found, a new record is written 32. The array 4 is provided with all numbers in the selected range. As a record 16 is created, that number is found in array 4 and the flag is changed 20 by that number in array 4. After the predetermined count is reached 28, remaining numbers of array 4 are written 32 and called or stored 34.

As shown in FIG. 2, records created in Steps 16 and 32 are concurrently used in a DTMF tone generator to place a call 36. Alternately, as shown in FIG. 3, the records created in steps 16 and 32 may be added 38 to file 39 and subsequently called 40. In one embodiment of the invention, after creation of 9,000 records of pseudorandom generated numbers, the final 10% or 1000 numbers are created in sequence.

The flagging and changing of the flagging may be accomplished, for example, by adding or changing a binary character adjacent the number.

While the invention has been described with reference to specific embodiments, modifications and variations may be made without departing from the scope of the invention which is defined in the following claims.

We claim:

1. The telephone call management random dialing method comprising generating a pseudorandom number from a range of possible numbers stored in an array, creating a record for the generated number and flagging the number in the array, generating a further pseudorandom number from the range of numbers, comparing that further generated number with earlier generated numbers and generating a further record for the further number upon finding that the number has not previously been generated and flagging the further number in the array, generating other pseudorandom numbers, checking to see whether the other numbers have been previously generated and creating file records in sequence for those other numbers that have not previously been generated and flagging the other numbers in the array, upon a time when less than a predetermined percentage of possible numbers in the range remain ungenerated, checking the array for the ungenerated numbers in numerical sequence and generating the heretofore ungenerated numbers in numerical sequence, generating file records for those last mentioned numbers and dialing the last mentioned numbers.

2. The method of generating sequential records of numbers to be called in a telephone call management system comprising selecting a three-digit exchange and randomly generating numbers selected from the last four digits of the seven-digit telephone numbers in the exchange, after generating a four-digit random number, checking with an array indicating previously generated numbers to determine if a previous generation indication exists for the generated random number, if an indication does exist for the generated random number, generating another random number, if an indication does not exist for the generated random number, creating a record with the generated random number, making an indication in the array, continuing to generate random numbers and checking each other random number as generated with indications of previously generated random numbers, generating another random number upon finding an indication and creating a record with the most recently generated random number upon finding no indication and changing that indication in the array, counting the records created and, upon a predetermined count, creating records with previously nongenerated numbers.

3. The telephone call management number generating method comprising choosing the range of numbers to be called, generating pseudorandom numbers within the range, calling the pseudo-random numbers in the order generated, marking previously generated called numbers, checking each subsequently pseudo-random generated number with previously generated and called numbers, calling each number not previously called, generating another pseudo-random number upon finding that a subsequently generated pseudo-random number matches a previously generated and called number.

4. The system of claim 3 further comprising counting the generated and called numbers, subsequently checking an array of numbers with markings by numbers previously generated and called and creating a record upon finding a number in the array which has not been generated and called until reaching a predetermined count.

5. The method of claim 3 further comprising stopping the pseudorandom generating after a predetermined percentage of the range of numbers has been called.

6. The method of claim 5 further comprising completing the range of numbers by calling and creating records from ungenerated numbers in an array in sequential order of the numbers.

7. The telephone call management method with random number generation comprising making an array of all numbers in numerical sequence in a range of numbers to be called, uniformly flagging numbers in the array, generating a first pseudorandom number, finding the first generated number in the array, checking a flag by that number in the array, if the flag has been changed, generating a new number, if the flag in the array by the first generated number has not been changed, creating a record of the first generated number and changing the flag in the array by the first generated number, using the created record for making a telephone call, generating a second pseudorandom number, finding the second generated number in the array, checking the flag by the second generated number in the array, if the flag has been changed generating a new number, if the flag has not been changed, changing the flag in the array by the second generated number and creating a record of the second generated number, using that second generated number for making a telephone call, generating an nth pseudorandom number wherein n is a whole number greater than two and less than the number of numbers in the range of numbers, finding the n number in the array, checking the flag in the array by the n number, generating a further number if the flag has been changed, if the flag is in its original state creating a record of the n number and changing the flag by the n number in the array, using the record of the n number to make a telephone call, continuing the generating of pseudorandom numbers, the finding of the generated numbers in the array, the checking of flags in the array by the generated numbers and the creating records and changing flags in the array and using the records to place telephone calls, counting records, comparing the record count with a preset count, if the preset count has not been reached, continuing to generate pseudorandom numbers to find numbers in the array to check the numbers to create records and change flags and use the numbers, if the preset count has been reached, searching the array in numerical sequence for unchanged flags and creating records in numerical sequence of numbers in the array by flags which remain unchanged, and using the records to make telephone calls.

8. The method of claim 7 wherein the using steps comprise making telephone calls when the records are created.

9. The method of claim 7 wherein the using steps comprise storing records in sequence as the records are created for later use in making telephone calls.

* * * * *